United States Patent [19]
Free

[11] Patent Number: 5,293,497
[45] Date of Patent: Mar. 8, 1994

[54] CABLE FOR TRANSMITTING EIGHT-BIT PARALLEL DATA

[75] Inventor: Gordon G. Free, Freeland, Wash.

[73] Assignee: Traveling Software, Inc., Bothell, Wash.

[21] Appl. No.: 48,854

[22] Filed: Apr. 15, 1993

Related U.S. Application Data

[62] Division of Ser. No. 668,778, Mar. 13, 1991, Pat. No. 5,261,060.

[51] Int. Cl.⁵ .................................. G06F 13/40
[52] U.S. Cl. ........................ 395/325; 364/935.3; 364/935.45; 364/933.62
[58] Field of Search ............ 439/623; 364/DIG. 2; 395/200, 325

[56] References Cited

U.S. PATENT DOCUMENTS

| | | | |
|---|---|---|---|
| 3,988,716 | 10/1976 | Fletcher et al. | 364/DIG. 1 |
| 4,400,778 | 8/1983 | Vivian et al. | 364/DIG. 1 |
| 4,495,572 | 1/1985 | Bosen | 364/DIG. 1 |
| 4,641,276 | 2/1987 | Dunki-Jacobs | 364/DIG. 2 |
| 4,833,605 | 5/1989 | Terada et al. | 364/DIG. 1 |

FOREIGN PATENT DOCUMENTS 0060932  9/1982  European Pat. Off. .

OTHER PUBLICATIONS

T. O. Anderson, "Computer Interface-Timing Control Logic," *Computer Design*, Feb. 1974, pp. 96-100.
Ross M. Greenberg, "Adapting the Parallel Port for Bidirectional Communication," *Microsoft Systems Journal*, Sep. 1990, pp. 107-117.
Murray Sargent and Richard L. Shoemaker, "The IBM Personal Computer from the Inside Out," Addison-Wesley Publishing Company, Inc., 1984, pp. 355-361.

*Primary Examiner*—Thomas M. Heckler
*Attorney, Agent, or Firm*—Christensen, O'Connor, Johnson & Kindness

[57] ABSTRACT

Disclosed is a system of transmitting data from a sending computer (10) to a receiving computer (30) in an 8-bit parallel format. Each computer includes a parallel communications port (14 and 34) having a data output register (24 and 44), a status register (26 and 46) and a control register (28 and 48). The method includes the steps of connecting the computers, configuring the receiving computer and writing the data to be transmitted at the sending computer. The method further includes the step of determining whether the receiving computer has the ability to receive 8-bit parallel communication. A cable for providing a communication link between the two computers is also disclosed.

4 Claims, 5 Drawing Sheets

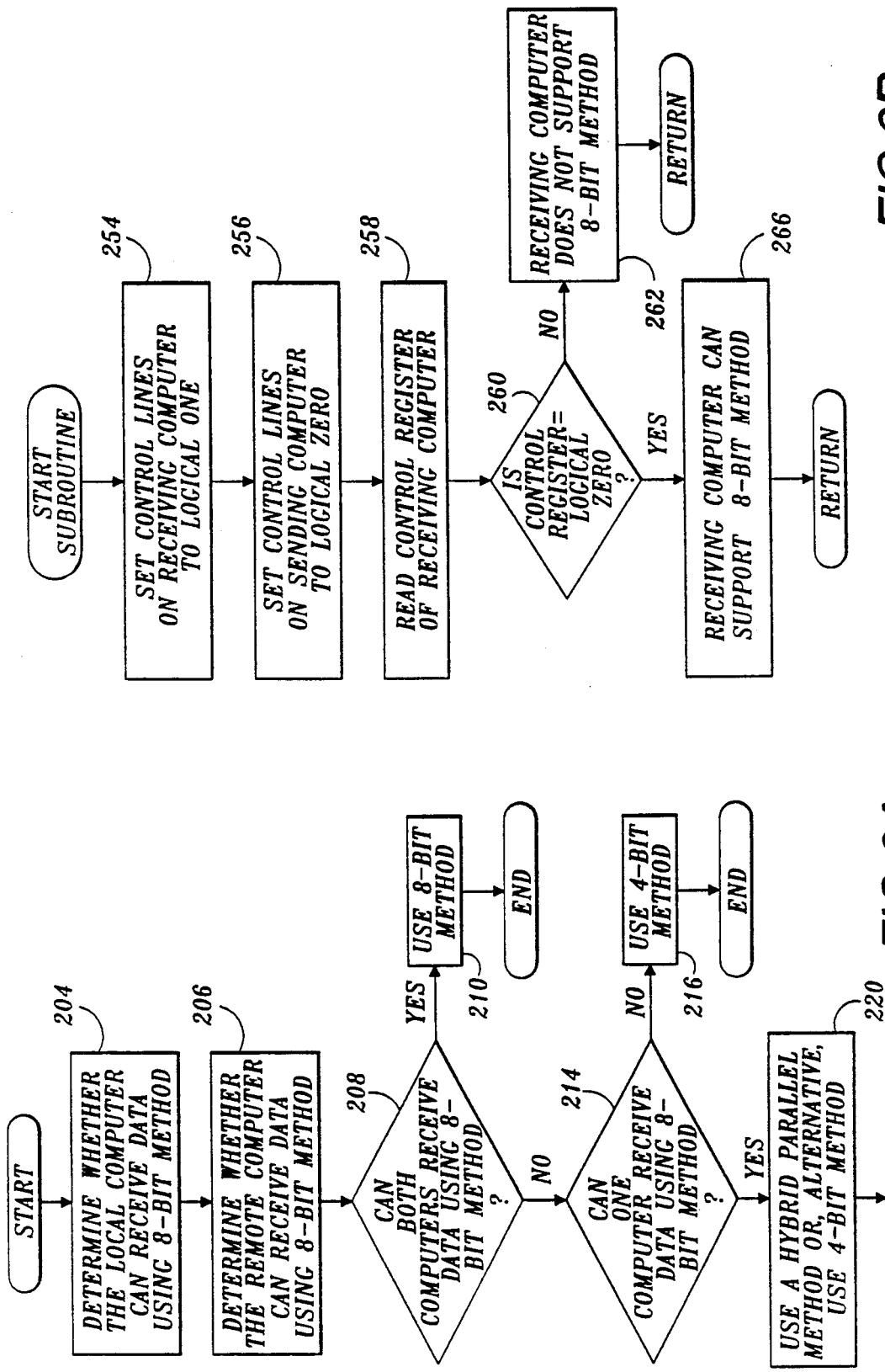

CABLE FOR TRANSMITTING EIGHT-BIT PARALLEL DATA

This is a divisional of the prior application Ser. No. 07/668,778, filed on Mar. 13, 1991, of Gordon G. Free for EIGHT-BIT PARALLEL COMMUNICATIONS METHOD AND APPARATUS, now U.S. Pat. No. 5,261,060, the benefit of the filing date of which are hereby claimed under 35 U.S.C. § 120.

FIELD OF THE INVENTION

The present invention relates to computer communications in general and, in particular, to a method and apparatus for providing parallel data communications between two computers.

BACKGROUND OF THE INVENTION

In computer communications technology, the rate of data communication between a computer and other peripheral devices is very important. The ability to quickly and accurately transfer data between two personal computers is of special interest in light of the increased use of portable computers. Often times, data entered into a portable computer is ultimately transferred to a user's home or office personal computer. Computer specialists are continually searching for communication protocols that increase data transfer rates without compromising the reliability of the data transmissions.

A conventional method for conveying data between computers, especially personal computers, involves the interconnection of a data bus disposed in a sending computer with a data bus disposed in a receiving computer. This is done by physically connecting the computer's serial or parallel ports through a link or data path. Serial communication is the input and output of data on one line, one bit at a time. Serial communications work well for transferring data over long distances but are unnecessarily slow when communicating between two devices that are relatively close. In contrast, parallel communication is the simultaneous transfer of a number of bits of data in parallel, i.e., on a multi-bit data path. The present invention is directed towards parallel communications.

Data paths for parallel communications range in widths such as 1-bit to 8-bit, 16-bit, and even wider. Parallel communication between two IBM-compatible personal computers has generally been limited to a 4-bit format due to perceived limitations in communication hardware. Each bit transferred in a parallel format requires its own line. Consequently, the number of bits that can be transferred is dependent upon the number of lines in the data path, which in turn, is limited by the interfacing equipment at each end of the path. Further, at least one additional line must be present in the data path to provide handshaking. Handshaking is the process by which two computers indicate to one another when data has been sent (strobe signal) and/or received (acknowledge signal).

In a conventional 4-bit method of parallel data transfer between two personal computers, the data are transmitted over a data path between the parallel ports wherein the path includes two unidirectional handshaking lines, generally referred to as a strobe line and an acknowledge line. The following steps are used to transmit data from the sending computer to the receiving computer:

1. the sending computer loads a piece of data on the data path through its parallel port;
2. the sending computer sets the strobe line to indicate that data are available;
3. the receiving computer recognizes the setting of the strobe line and reads the data on the data path through its parallel port;
4. the receiving computer sets the acknowledge line to indicate that data has been read; and
5. the sending computer recognizes the setting of the acknowledge line.

This process can be repeated indefinitely.

As described, the standard 4-bit intercomputer communication is done by connecting the parallel ports of two computers. The parallel ports on the majority of personal computers were designed for unilateral data transfer to a printer. Printer data are generally sent 8-bits at a time. The standard parallel interface for these computers includes seventeen active lines which are manipulated through three input/output (I/O) registers in the computer. These include data output, status and control registers. Of the active lines in the interface, eight are for data output, five are for checking the status of the printer and four are used to control the printing.

With respect to the majority of personal computers, the data output register and associated data pins are unidirectional, i.e. the computer can send data but not receive it through that register. Thus, although 8-bit parallel data can be sent to a device such as a printer, 8-bit parallel transfer cannot occur between two personal computers simply by connecting the data lines from the parallel ports and instructing one computer to send the data. The two parallel ports from each computer would fight for simultaneous control over the data lines, making data on those lines unreliable. Further, such a connection would likely cause harm to the data output register of at least one of the computers.

The five pins associated with the status register are also unidirectional, but in the opposite direction, carrying signals from the receiving device to the sending computer. Thus, prior systems providing 4-bit parallel intercomputer communication have connected five of the data lines from each computer to the status lines of the other computer to provide ten lines through which the computers can communicate bidirectionally. With regard to each computer, four of these lines are used to communicate a nibble, or four bits, of data and the fifth line is used as a strobe/acknowledge line as described above.

The available 4-bit parallel intercomputer communication format has been proven reliable. However, with the increased reliance on personal computer communications, the demand for increased communication speed is increasing. The present invention provides a reliable 8-bit intercomputer communications method using standard parallel ports.

SUMMARY OF THE INVENTION

The present invention is a cable for use in transmitting parallel data between a first computer and a second computer, wherein the first computer and the second computer are of the type that include a parallel communications port having a data output register, a status register and a control register. The cable includes (a) a first connector that is connectable to the parallel communications port of the first computer; (b) a second connector that is connectable to the parallel communications port of the second computer; (c) and a plurality of conductive leads disposed between the first and second connectors. The plurality of connectors include a first set of leads that couple the data output register of the first computer to the status register of the second computer, wherein the first set of leads carry a first portion of the parallel data from the first computer to the second computer, and a second set of leads that couple that control register of the first computer to the control register of the second computer, wherein the second set of leads carry a second portion of the parallel data from the first computer to the second computer.

In accordance with other aspects of the invention, the plurality of conductive leads further include an acknowledge line that couples the data output register of the first computer to status register of the second computer. Further, the parallel data transmitted between the first and second computers are transmitted in 8-bit bytes. The first portion of parallel data carried on the first set of leads is a 4-bit nibble of data and the second portion of parallel data carried on the second set of leads is a 4-bit nibble of data.

In accordance with still further aspects of the invention, the second set of leads are bidirectional such that data are transmitted from the control register of the second computer to the control register of the first computer. Also, the conductive leads further comprise a third set of leads that couple the data output register on the second computer to the status register of the first computer, wherein the third set of leads carry parallel data from the second computer to the first computer.

BRIEF DESCRIPTION OF THE DRAWINGS

The various features and advantages of the invention will be understood in view of the following description taken in conjunction with the accompanying drawings in which:

FIG. 6A is a flow chart of a routine for determining whether an 8-bit parallel communications method in accordance with the present invention can be used between two computers; and FIG. 6B is a flow chart of a subroutine in the flow diagram of FIG. 6A for determining whether a computer can receive data using an 8-bit parallel communications method in accordance with the present invention.

DESCRIPTION OF THE PREFERRED EMBODIMENTS

Figure 1:
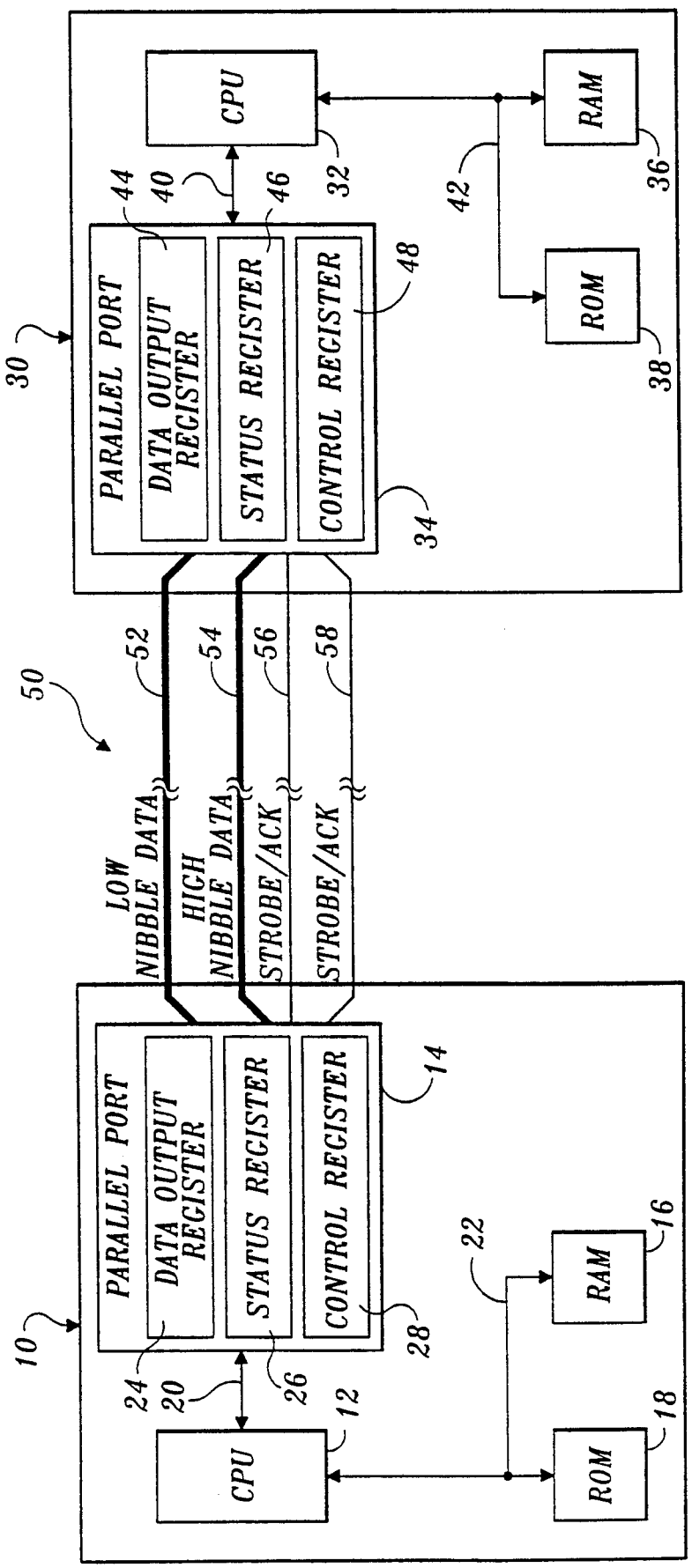
FIG. 1 is a block diagram of a communications network in accordance with the present invention.

With reference to FIG. 1, a sending computer 10 is connected to a receiving computer 30 via a communications link 50. The computers are a type generally known in the art. The communications link and the method of controlling communications across the link are the focus of the present invention.

The sending computer 10 generally comprises a central processing unit (CPU) 12, a parallel communications port 14, a random access memory (RAM) 16 and a read only memory (ROM) 18. The CPU 12 is connected to the parallel communications port 14 by a data bus 20. The RAM 16 and the ROM 18 are connected to the CPU 12 by data/address lines 22. The parallel port 14 is an input/output device that includes a data output register 24, a status register 26 and a control register 28. The receiving computer 30 is similar to the sending computer and comprises a CPU 32, a parallel communications port 34, a RAM 36, a ROM 38, a data bus 40, and data/address lines 42. The parallel communications port 34 includes a data output register 44, a status register 46 and a control register 48. Although for ease of description one computer is called the receiving computer and the other is called the sending computer, the computers are generally interchangeable.

The communications link 50 connects the sending computer 10 to the receiving computer 30. The communications link 50 comprises a low nibble (i.e., 4 bits) data link 52, a high nibble data link 54, a strobe/ack line 56, and a strobe/ack line 58. The strobe/ack line 56 carries a strobe signal generated by the sending computer 10 to alert the receiving computer 30 that data are being transmitted. The strobe/ack line 58 carries an acknowledge signal generated by the receiving computer 30 to indicate to the sending computer 10 that data have been received. The communications link 50 is configured to allow both 4-bit and 8-bit parallel data transfer. The communications link may take the form of a cable having port connecting ends connected by communication wires. The wires are connected as the low and high nibble data links 52 and 54 described above.

Figure 2:
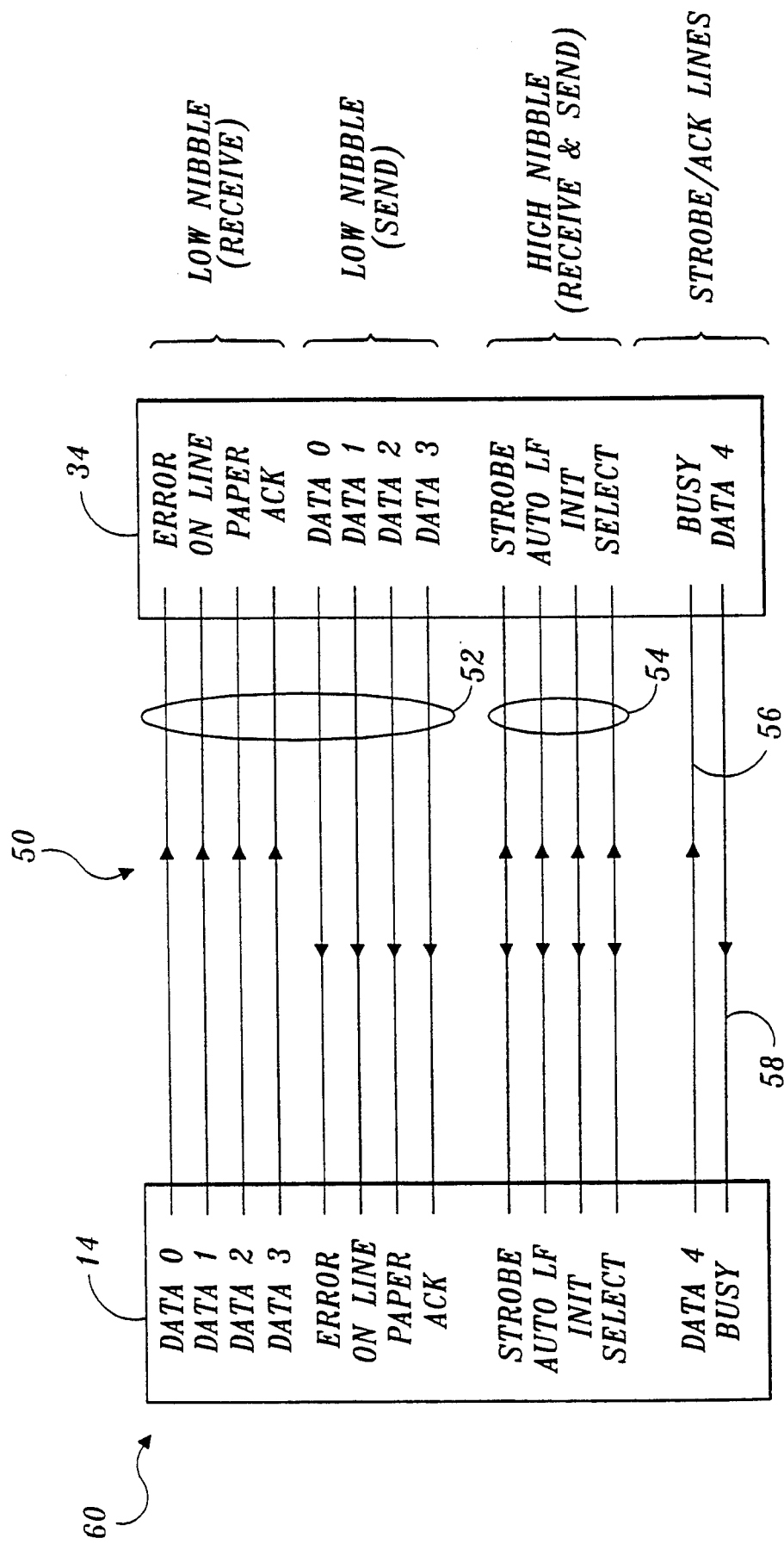
FIG. 2 is a block diagram of an embodiment of an 8-bit parallel communications link in accordance with the present invention.

With reference to FIG. 2, the communications link 50 interconnects the parallel communications ports 14 and 34 of the computers 10 and 30. The parallel communications ports described herein may be chip components of a larger input/output computer control board. The parallel communications port in a typical computer includes seventeen active pins associated with its three registers. The pins are physically connected to lines in communications link 50. The pins and lines are conceptually the same, i.e., they represent the interface between the registers and the communications link.

Exploring further the three registers of a parallel communications port, the data output register is the address to which a byte of data is generally sent on its way to a printer or other peripheral device and includes eight unidirectional data lines. In this case, only lines D0-D4 are shown. The status register receives information about the printer, allowing the computer to continuously monitor the printer to sense when it is all right to send data. The status register includes five pins: Error, On-line, Paper, Acknowledge (Ack) and Busy. The remaining four pins, addressed through the control register, allow the computer to give instructions to the printer. These include Strobe, Auto LF, Initialize (Init) and Select. The relationship between the three registers and associated pins of a typical parallel communications port is depicted in Table 1.

TABLE 1

| Parallel Communications Port Registers and Pin Numbers | | |
|---|---|---|
| Register | Pin | Function |
| Data Output | 2 | Data Bit 0 |
| | 3 | Data Bit 1 |
| | 4 | Data Bit 2 |

TABLE 1-continued

Parallel Communications Port Registers and Pin Numbers

| Register | Pin | Function |
|---|---|---|
|  | 5 | Data Bit 3 |
|  | 6 | Data Bit 4 |
|  | 7 | Data Bit 5 |
|  | 8 | Data Bit 6 |
|  | 9 | Data Bit 7 |
| Status | 15 | Error |
|  | 13 | On-line |
|  | <u>12</u> | Paper |
|  | 10 | Ack |
|  | <u>11</u>* | Busy |
| Control | <u>1</u> | Strobe |
|  | 14 | Auto LF |
|  | <u>16</u> | Init |
|  | 17 | Select |

Of the seventeen active pins, fourteen are used to provide 8-bit parallel communications according to the method of the present invention. The low nibble data link 52 and strobe/ack lines 56 and 58 connect the data output registers 24 and 44 to the status registers 46 and 26, respectively. More particularly, five of the eight output pins from each of the data output registers 24 and 44 are connected via connecting lines to the five input pins of each status register 46 and 26, respectively. Four of these lines are used to transmit a nibble of data to a receiving computer, e.g., from data output register 24 to status register 46. An additional four of these lines are used to transmit a nibble of data in the opposite direction, from the data output register 44 of receiving computer 30 to the status register 44 of the sending computer 10. The remaining two lines are the strobe/ack lines 56 and 58. The high nibble data link 54 connects the four pins of each control register 26 and 48.

These strobe/ack lines 56 and 58 provide a dual role for each computer. The strobe/ack 56 allows sending computer 10 to indicate to receiving computer 30 that: (1) data have been placed on communications link 50 (strobe), and (2) that data sent from the receiving computer have been received by the sending computer (ack). The strobe/ack line 58 provides the same indicators to the sending computer from the receiving computer, e.g., that: (1) data placed on the communications link 50 have been received (ack), and (2) that data have been placed on the communications link 50 by the receiving computer (strobe). Using this convention, the two computers can communicate to one another using traditional two-way handshaking methods.

In one actual embodiment, data lines D0-D3 of each computer are connected to the status register of the other computer through the Error, On-line, Paper and Ack pins, respectively. Data line D4 of each computer is connected to the Busy pin of the other computer's status register. Further, the Strobe, Auto LF, Init, and Select pins of the two computers 10 and 30 are connected through communications lines 50. It should be noted that the particular pairing of data and status lines is not critical to the invention and can be manipulated for programming convenience or other reasons. The pairing of control lines can also be altered by those skilled in the art.

The four pins of a typical control register, such as control registers 28 and 48, allow a computer to send instructions to a peripheral device such as a printer. The lines connected to these pins were traditionally considered to be unidirectional; their purpose being to send data rather then to receive it. However, in most personal computers these pins can also be used as inputs to receive data. Computers having control registers with the ability to read inputs into their open-collector drivers or similar components can receive data at the control registers. Although such drivers are known in the art, to appreciate their application in the present invention, a brief description of a such a control register's internal design is presented herein.

Figure 3:
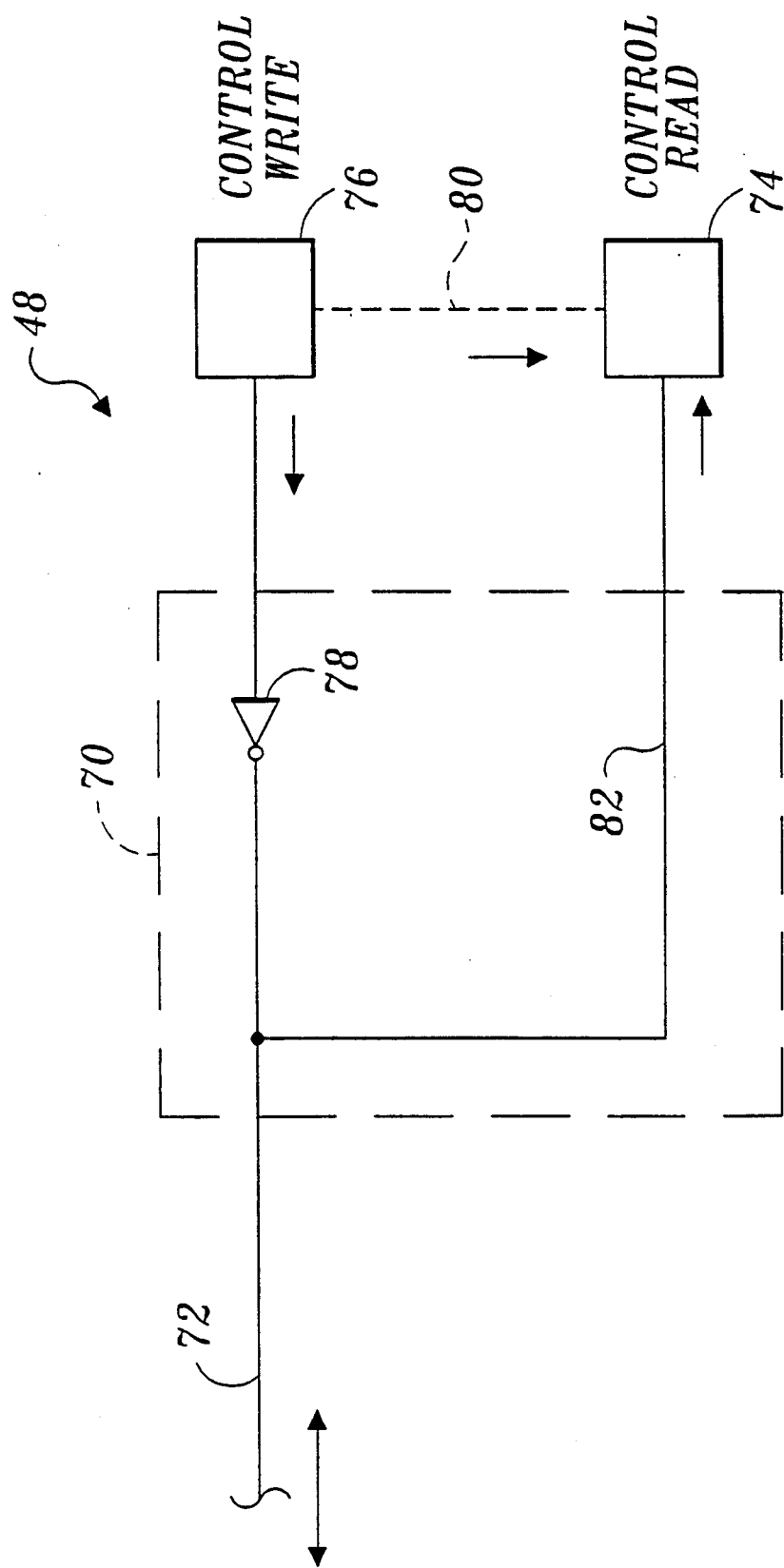
FIG. 3 is a schematic diagram of a prior art control register open-collector driver typically used in a personal computer.

With reference to FIG. 3, a typical prior art control register, such as control register 48 of receiving computer 30, includes four buffered open-collector drivers, one for each control line or pin. For ease of description, only a single driver 70 is shown. Since an open-collector can be driven externally, the line 72 connected thereto can carry data input as well as output.

Prior art control registers, such as register 48, include two separate related components or subregisters that share the same address. The components are control read pin 74 and control write pin 76. The pin accessed by the receiving computer 30 depends upon whether it is performing a read or write operation with respect to the control register. Control write pin 76 is accessed when a computer does a WRITE operation to the control register. Control read pin 74 is accessed during a READ operation to the control register.

Each driver in a control register also receives two inputs. As an illustration, the input to driver 70 includes: (1) the value on line 72 from the sending computer's control register, and (2) the stored value from the control write pin 76 after being inverted by an inverter 78. These values are combined and written to control read pin 74. The stored value from control write pin 76 is the last value written to the particular control write pin by the receiving computer.

By convention, inverter 78 is present for three of the four control lines associated with a computer's control register. On the inverting lines, the value written to or stored at a control write pin is inverted prior to being combined with the value on line 72. On the non-inverting line, the stored value itself is combined with the value on line 72. FIG. 3 is illustrative of a driver having an inverting line. In many computers, the control register pins are configured so that the Auto LF pin is non-inverting and each of the other pins are inverting.

The driver 70 works as a logical AND gate, combining the input from the sending computer on line 72 with the inverted value of the input stored at the control write pin 76. To allow data to be accurately transferred from the sending computer, it is necessary to have the value from the sending computer combined with a logical one. As is known, a Boolean variable X ANDed with a logical one is equal to the value of X. Thus, setting the stored value at the control write pin 76 of the receiving computer to logical zero provides a logical one at the output of inverter 78, allowing the unaltered input from the sending computer on line 72 to be transferred to the receiving computer's control read pin 74.

With regard to the sending computer (not shown), data is transmitted to the receiving computer along the line 72, by writing the data bit to its corresponding control register control write pin. The value can then be read by the receiving computer at its control read pin. In the present invention, a logical one must appear at each line of the control register 48 at the junction of lines 72 and 82 so that each driver is able to receive the value from the sending computer. As an example of achieving this, if the order of the control write pins is Strobe, Auto LF, Init and Select, then to provide a 1111, or logical one at the control register, the binary value 0100 (hexadecimal 04) is written to the control register. The first, second and fourth bits are inverted by the inverting pins and the result is 1111 appearing at the junction of lines 72 and 82 across the drivers.

With reference again to FIG. 3, a small percentage of computers have a slightly different configuration within their control registers. In these computers, a connecting line 80, rather than line 82, establishes the connection between the control write and control read pins. These computers are not able to receive data using the 8-bit method of the present invention because their control read pins 74 report the last value written to the control write pin 76. Thus, a read operation to the control register of such a computer presents the data last written by the computer to its own register. These registers cannot report the value present at the open-collector driver, e.g., the actual state of the line 72.

A relatively efficient method of testing whether the control register of a computer is able to receive data in an 8-bit format is to provide a logical one to the open-collector driver and instruct the sending computer to transmit a logical zero. If the data at the corresponding control read pin 74 is the same as the value placed on the line 72, i.e., a logical zero, then the control register is able to receive data using this method. The important characteristics of such control registers is that they can be configured to read the value of the data on the set of lines 72, as described above. Thus, computers including such control registers can be used to receive 8-bit parallel transmissions in accordance with the present invention, wherein 4 bits are received at the control register.

In order to accomplish the 8-bit parallel communications method of the present invention, the receiving computer and the sending computer include computer program controls. The computer program controls can be stored in the RAM and are executed by the CPUs of each computer. In one actual embodiment, the receiving and sending computer program controls are combined into a single program that is available at each computer. In this manner, each computer can operate as a sending or a receiving computer. Because of the handshaking requirement, the two programs are executed simultaneously.

Generally, on the receiving computer side, an appropriate value is written to the control register 48 to set the control lines associated with that register to logical one, and the acknowledge line is initialized to logical one. At this point, the receiving computer 30 is prepared to receive data from the sending computer. A check is made to determine if data are ready to be transmitted from the sending computer 10. If data are ready, the receiving computer receives and constructs a byte of data. On the sending computer side, the sending computer 10 initializes the strobe line prior to transmitting any data. The data are then loaded into the sending computer's registers. An indication is given that data are ready to be sent and a check is made to determine if the data were received. Finally, a check is made to determine whether all of the data have been sent. The execution of these two program controls on receiving and sending computers allows for the 8-bit parallel transfer of data over the communications link 50.

Figure 4:
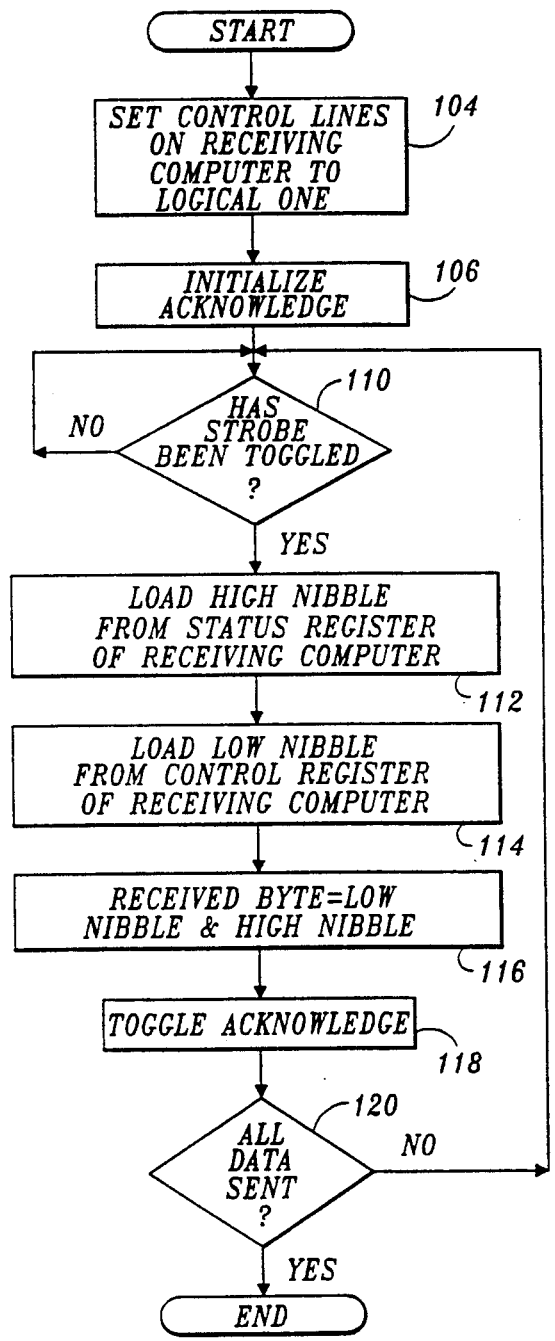
FIG. 4 is a flow chart of a routine by which a receiving computer implements 8-bit parallel communications according to the present invention.

With reference to FIG. 4, at block 104 an appropriate value is written to the control register 48 to initialize the control lines associated with that register to logical one, i.e., to assure a logical one appears at the open-collector drivers of that register. At block 106, the acknowledge line is initialized to logical to logical one. At this point, the receiving computer is prepared to receive data from the sending computer. A continuous loop is executed at decision block 110 waiting for the strobe to be toggled. When the strobe has been toggled, i.e., changed from logical one to logical zero or vice versa, this indicates that there are data to be transmitted by the sending computer. At this point, the data are available on the connecting lines and are therefore available at the receiving computer's registers. The data are sent as two nibbles of data. At block 112, the receiving computer 30 obtains the high nibble of an 8-bit data transfer by reading the contents of the status register 46. At block 114, the receiving computer 30 receives the low nibble by reading the contents of the control register 48. At block 116, the low nibble is concatenated with the high nibble to form the data byte.

At block 118, after receiving the data, the acknowledge line is toggled to indicate to the sending computer 10 that the data were received. At block 120, the receiving computer determines if there are any additional data to be sent from the sending computer. This determination can be made by known data communication methods. If there are no additional data, the process terminates. Otherwise, the process loops back to block 110 and waits to receive another byte of data.

Figure 5:
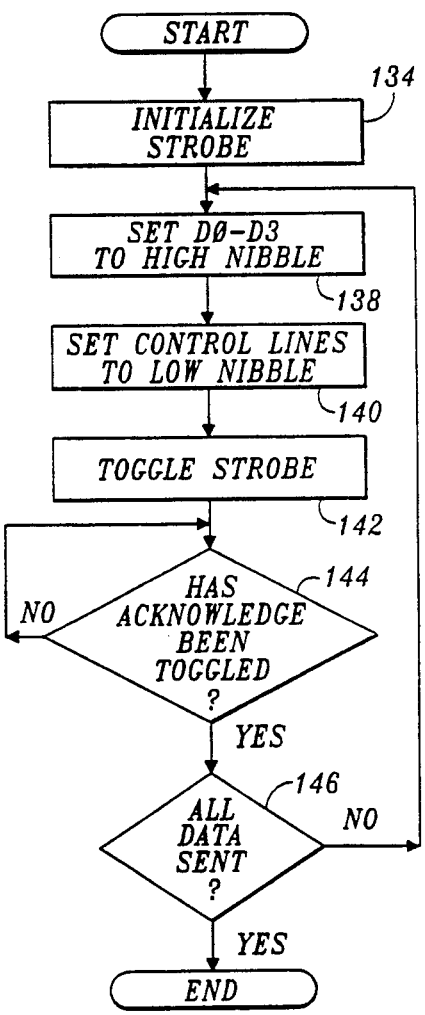
FIG. 5 is a flow chart of a routine by which a sending computer implements 8-bit parallel communications according to the present invention.

With reference to FIG. 5, at block 134 the sending computer initializes the strobe line prior to transmitting any data. The acknowledge line and strobe line are preferably initialized to the same logical value. Throughout the transfer process, when the value of a line is changed to indicate that data are ready to transmit (strobe) or have been received (acknowledge), the line is simply toggled, i.e., from one-to-zero or zero-to-one. Using this convention, a transfer of data takes place upon the toggling of both lines. Thus, data can be sent when the line values are the same and cannot be sent when the line values differ.

At block 138, the data output register 44 related to lines D0-D3 of the sending computer 10 is loaded with the high nibble of the data to be sent. The low nibble of the data is then loaded on the control register 28 of the sending computer in block 140. Once the data byte is loaded, the strobe line is toggled at block 142 to indicate to the receiving computer 30 that a byte of data is available. At decision block 144, the sending computer waits for the acknowledge line to be toggled by the receiving computer 30, thereby indicating that the receiving computer received the data. Once the data have been received, a decision is made at block 146 at to whether there are additional data to be sent. If there are more data to be sent, the procedure loops back to block 138 to transmit another byte of data.

The present method of 8-bit parallel data communications will work on a majority of personal computers. However, a small percentage of computers are unable to use this method. As noted above, a number of computers are configured so that the control register cannot read the data that are on the input lines to the register but rather reads the data that were last written by the computer to its own register. Thus, although a sending computer can always place a nibble of data on the four control lines, it is not necessarily the case that all receiving computers can accurately receive that nibble. In light of the existence of these computers, a method is provided by the present invention for determining if two particular computers support 8-bit parallel communications.

It should be noted that it is not necessary that both computers be able to receive 8-bit parallel data transmission in order to obtain the benefits of the present invention. For example, one computer could receive data in an 8-bit format and the other in a 4-bit format. If the ability of the computers to receive data in the 8-bit parallel format of the present invention is not initially known, it is necessary to test the computers before communication begins. Preferably, this test will be run upon startup of the method of the present invention using standard 4-bit parallel transfer techniques.

With reference to FIGS. 6A and 6B, a routine and a subroutine thereof are implemented by one of the computers to determine which format is to be used. For clarity, the computer carrying out the instructions described herein is called the local computer and the other is referred to as the remote computer.

At block 204, the subroutine illustrated in FIG. 6B is executed to determine whether the local computer can receive data using the 8-bit parallel method. At block 206, the subroutine is again executed to determine whether the remote computer can receive data in the 8-bit parallel format. At decision block 208, a determination is made based on the results from the subroutine whether both the local and remote computers can receive data using the 8-bit parallel method. If both computers can operate in this manner, at block 210 8-bit parallel communication is initiated in accordance with the present invention. That is, both the local and remote computers send and receive data in the 8-bit parallel format.

If both computers cannot receive data in the 8-bit parallel format, at block 214 a determination is made whether either computer can receive data in the 8-bit format. If neither computer has this ability, communication between the computers is continued through the standard 4-bit parallel format at block 216. Finally, if only one of the computers can receive data in the 8-bit parallel format, at block 220, a hybrid type of communications is established. The computer that cannot receive 8-bit parallel data transmissions is controlled to send 8-bit parallel transmissions to the computer that can receive such transmissions. In turn, the latter computer is controlled to send 4-bit parallel data transmissions to the first computer. In one embodiment, at block 220, if one of the interconnected computers cannot receive an 8-bit parallel data transmission, even if the other computer can, both computers will operate in a 4-bit communications format. Alternatively, those skilled in the art can provide means for the computer user to interactively select to use a hybrid parallel communications method (i.e., sending data using an 8-bit parallel format to one computer and a 4-bit parallel format to the other computer) or standard 4-bit communications at block 220.

FIG. 6B illustrates a subroutine executed in conjunction with blocks 204 and 206 of FIG. 6A. For ease of discussion, the computer under test will be the local computer as if the subroutine were called from block 204. It is to be understood that the same routine is executed for the remote computer at block 206. At block 254, the control lines on the local computer are set to logical one. At block 256, the control lines on the remote computer are now loaded with data other than a logical one to determine whether the local computer is of the type that reads the actual state of the lines connected to its control register, or alternatively, reads the last value written to the control write pin of its own control register. In one actual embodiment, a logical zero is written on the lines. At block 258, the control read pins of the logical computer's control register are read. At decision block 260, a determination is made at to whether the control register has read a logical zero. If the register is logical zero, the control register is the type that reads the actual input onto the intercomputer data line. Thus, the local computer can receive data in the 8-bit parallel transfer format. This is reported at block 266. Otherwise the subroutine reports at block 262 that the local computer cannot support an 8-bit parallel transfer format. The subroutine is completed and returns control to the main routine.

Although the present invention has been described with respect to its preferred embodiments, those skilled in the art will realize that changes may be made in form and scope without departing from the spirit of the invention. Therefore, the scope of the invention should be determined solely by reference to the following claims.

What is claimed is:

1. A cable for use in transmitting parallel data between a first computer and a second computer, wherein the first computer and the second computer are of the type that include a parallel communications port having a data output register, a status register and a control register, wherein the cable comprises:
    a first connector that is connectable to the parallel communications port of the first computer,
    a second connector that is connectable to the parallel communications port of the second computer,
    a plurality of conductive leads disposed between the first and second connectors, wherein the plurality of conductive leads include:
    a first set of leads that couple the data output register of the first computer to the status register of the second computer, wherein the first set of leads carry a first portion of the parallel data from the first computer to the second computer; and
    a second set of leads that couple that control register of the first computer to the control register of the second computer, wherein the second set of leads carry a second portion of the parallel data from the first computer to the second computer.

2. The cable of claim 1, wherein the plurality of conductive leads further include an acknowledge line that couples the data output register of the first computer to the status register of the second computer.

3. The cable of claim 1, wherein the parallel data transmitted between the first and second computers is transmitted in 8-bit bytes and wherein the first portion of parallel data carried on the first set of leads is a 4-bit nibble of data and wherein the second portion of parallel data carried on the second set of leads is a 4-bit nibble of data.

4. The cable of claim 1, wherein the second set of leads are bidirectional such that data are transmitted from the control register of the second computer to the control register of the first computer and wherein the plurality of conductive leads further comprises:
    a third set of leads that couple the data output register on the second computer to the status register of the first computer, wherein the third set of leads carry parallel data from the second computer to the first computer.

* * * * *

UNITED STATES PATENT AND TRADEMARK OFFICE
CERTIFICATE OF CORRECTION

PATENT NO. : 5,293,497
DATED : March 8, 1994
INVENTOR(S) : G. G. Free

It is certified that error appears in the above-indentified patent and that said Letters Patent is hereby corrected as shown below:

| COLUMN | LINE | |
|---|---|---|
| 5 (Table 1) | 10 | "12" should read --12-- |
| 5 | 11 | "10" should read --10-- |
| 8 | 1 | delete "to logical" (second occurrence) |
| 10 | 4 | "logical" should read --local-- |

Signed and Sealed this

Twenty-third Day of August, 1994

Attest:

BRUCE LEHMAN

*Attesting Officer*   *Commissioner of Patents and Trademarks*